(12) United States Patent
Mehrseresht

(10) Patent No.: US 10,380,173 B2
(45) Date of Patent: Aug. 13, 2019

(54) DYNAMIC FEATURE SELECTION FOR JOINT PROBABILISTIC RECOGNITION

(71) Applicant: CANON KABUSHIKI KAISHA, Tokyo (JP)

(72) Inventor: Nagita Mehrseresht, Castle Hill (AU)

(73) Assignee: Canon Kabushiki Kaisha, Tokyo (JP)

( * ) Notice: Subject to any disclaimer, the term of this patent is extended or adjusted under 35 U.S.C. 154(b) by 164 days.

(21) Appl. No.: 14/834,241

(22) Filed: Aug. 24, 2015

(65) Prior Publication Data

US 2016/0063358 A1    Mar. 3, 2016

(30) Foreign Application Priority Data

Aug. 29, 2014 (AU) ................... 2014218444

(51) Int. Cl.
  *G06K 9/00* (2006.01)
  *G06K 9/62* (2006.01)
  *G06K 9/72* (2006.01)
  *G06F 16/583* (2019.01)

(52) U.S. Cl.
  CPC ..... *G06F 16/5838* (2019.01); *G06K 9/00684* (2013.01); *G06K 9/6231* (2013.01); *G06K 9/6297* (2013.01); *G06K 9/72* (2013.01)

(58) Field of Classification Search
  CPC .... G06K 9/6228; G06K 9/623; G06K 9/6231; G06K 9/72; G06K 9/6297; G06K 9/00684; G06F 17/30256; G06F 16/5838
  USPC ........................................................ 382/190
  See application file for complete search history.

(56) References Cited

U.S. PATENT DOCUMENTS

| 8,358,856 | B2 | 1/2013 | Loui et al. | |
|---|---|---|---|---|
| 2009/0208106 | A1 | 8/2009 | Dunlop et al. | |
| 2010/0040285 | A1 | 2/2010 | Csurka et al. | |
| 2011/0305392 | A1* | 12/2011 | Kapoor | G06K 9/6228 382/174 |
| 2013/0204809 | A1* | 8/2013 | Bilenko | G06N 99/005 706/12 |

(Continued)

OTHER PUBLICATIONS

Karayev, Sergey, et al. "Timely object recognition." Advances in Neural Information Processing Systems. 2012.*

(Continued)

*Primary Examiner* — Geoffrey E Summers
(74) *Attorney, Agent, or Firm* — Canon U.S.A., Inc. I.P. Division

(57) ABSTRACT

A method of jointly classifying a plurality of objects in an image using a feature type selected from a plurality of feature types determines classification information for each of the plurality of objects in the image by applying a predetermined joint classifier to at least one feature of a first type. The feature is generated from the image using a first feature extractor, the classification information being based on a probability of each of a plurality of possible classifications. The method estimates, for each of the feature types, an improvement in an accuracy of classification for each of the plurality of objects. The method selects features of a further type, from the plurality of feature types, according to the estimated improvement in the accuracy of the classification of each of the objects, and classifies the plurality of objects in the image using the selected features of the further type.

18 Claims, 11 Drawing Sheets

(56) References Cited

U.S. PATENT DOCUMENTS

2013/0232140 A1* 9/2013 Ishii .................. G06K 9/623
 707/723
2014/0140625 A1 5/2014 Zhang et al.
2014/0207713 A1* 7/2014 Haws ................ G06N 99/005
 706/12

OTHER PUBLICATIONS

Nan, Feng, et al. "Fast margin-based cost-sensitive classification." Acoustics, Speech and Signal Processing (ICASSP), 2014 IEEE International Conference on. IEEE, 2014.*

Frost, Jim. "Linear or Nonlinear Regression? That is the question." Minitab. Jul. 28, 2011.*

Karayev, et al., "Timely Object Recognition", Advances in Neural Information Processing Systems 25, Proceedings from Neural Information Processing Systems, Lake Tahoe, Nevada, USA, Dec. 2012, pp. 899-907 (also numbered as pp. 1-9).

* cited by examiner

DYNAMIC FEATURE SELECTION FOR JOINT PROBABILISTIC RECOGNITION

REFERENCE TO RELATED PATENT APPLICATION(S)

This application claims the benefit under 35 U.S.C. § 119 of the filing date of Australian Patent Application No. 2014218444, filed Aug. 29, 2014, hereby incorporated by reference in its entirety as if fully set forth herein.

TECHNICAL FIELD

The present invention relates generally to joint recognition and classification in images, and in particular, a method, apparatus and system for dynamically selecting recognition features in images. The present disclosure also relates to a computer program product including a computer readable medium having recorded thereon a computer program for selecting features for joint recognition purpose.

BACKGROUND

Semantic understanding of a visual media, such as an image or a video capture of a scene, requires recognition of various semantic concepts associated with the scene. In such applications, recognition refers to any one of detection, classification, categorisation or a localisation operation, while a semantic concept refers to objects, actions, interactions and events which are associated with the scene. The categorisation of the scene, such as home, office, street view, beach or park, is also a semantic concept.

Semantic concepts associated with a scene may be related. For example, the types of objects and actions expected to appear in an indoor home scene are different to the types of objects and actions expected for an outdoor beach scene or a train station. Thus, it is desirable to exploit the relationship between various concepts associated with a scene. One type of approach to exploiting such relationships is to use a probabilistic model of a scene and jointly recognise the various concepts associated with the scene.

Recognition of various semantic concepts in an image requires different feature types, such as Space-Time Interest Point (STIP), Histogram of Oriented Gradient (HOG), Scale Invariant Feature Transform (SIFT), colour descriptors such as red, green, blue (RGB) histogram, colour moments, HSV SIFT (Hue, Saturation, Value, a cylindrical colour space; Scale Invariant Feature Transform). This is because different feature types are designed to be more discriminative for different attributes of image data. Further, different feature types may provide different levels of invariance to variations in the image data. Using a combination of different feature types allows a system to take advantage of the differences in discriminative and invariant properties of the feature types when inferring semantic concepts. As a result it is often advantageous to use multiple feature types even when recognising a single semantic concept in an image.

One recognition approach is to determine all the desired features and build a complete model before starting the inferencing process. Determining all the features, however, may be computationally expensive, as feature calculation may consume a significant portion of available computation resources. Determining all desired features may also significantly delay the recognition of semantic concepts in the image. When computation resources are limited, or fast recognition is required, recognition needs to be performed with a limited selection of feature types. Dynamically selecting and determining the features types which are used for joint recognition of various semantic concepts may also be beneficial when the recognition time or budget is not known ahead of time.

Another approach for selecting feature types for classification is to use a decision tree. Decision tree classifiers may be built with a consideration of the feature cost and measure the computational complexity of calculating a feature of a selected feature type. Decision trees, however, are not appropriate for exploiting the dependencies between different concepts. As a result, probabilistic joint classifiers often have better classification performance than decision trees.

An ensemble of classifiers built for a classification task may also be modified to include a feature cost which provides an estimate of the time required to calculate features of a particular type. Using an ensemble classifier, it is possible to select the classification feature types at inference time. However, similar to decision trees, ensemble classifiers do not exploit correlation between different concepts, and therefore often have inferior classification performance compared to probabilistic joint classifiers.

Due to interdependencies between different associated concepts, selecting and prioritising the features which are the most beneficial for a given joint recognition task is a difficult problem. For instance, content interdependency could affect the classification results differently, depending on the concepts which exist in a scene.

Thus, there exists a need for a method for dynamically selecting recognition features while also exploiting the interdependencies between different concepts.

SUMMARY

According to one aspect of the present disclosure, there is provided a computer-implemented method of jointly classifying a plurality of objects in an image using a feature type selected from a plurality of feature types, the method comprising:

determining classification information for each of the plurality of objects in the image by applying a predetermined joint classifier to at least one feature of a first type, the at least one feature being generated from the image using a first feature extractor, the classification information being based on a probability of each of a plurality of possible classifications;

estimating, for each of the feature types, an improvement in an accuracy of classification for each of the plurality of objects, the estimated improvement being formed using the determined classification information for each of the objects and a type of each of the objects in the image;

selecting features of a further type, from the plurality of feature types, according to the estimated improvement in the accuracy of the classification of each of the objects; and classifying the plurality of objects in the image using the selected features of the further type.

Desirably the method further comprises determining a benefit of evaluating a particular feature type of the plurality of feature types based on the estimated improvement in accuracy of classification. Preferably the benefit is determined by normalising the estimated improvement in accuracy with a computation cost, such that the benefit is a measure of the estimated improvement in accuracy improvement per computation cost. Alternatively the benefit may be determined using a trade-off across expected total accuracy improvement and a computation cost.

In another implementation the estimating comprises determining a direct accuracy improvement and an indirect accuracy improvement associated with a particular feature, and summing the direct accuracy improvement and the indirect accuracy improvement to provide the estimated improvement in accuracy. Desirably the determining of at least one of the direct accuracy improvement and the indirect accuracy improvement comprises linear regression of unprocessed features. In a specific application evaluation of the regression utilizes the determined classification information. Advantageously the determining of the direct accuracy improvement comprises non-linear regression of unprocessed features.

In another implementation the estimated improvement is formed using a pair-wise interaction of the determined classification information for each of the objects and a type of each of the objects in the image.

According to another aspect of the present disclosure, there is provided a method of jointly classifying a plurality of objects in data using a feature type selected from a plurality of feature types, the method comprising:

determining classification information for each of the plurality of objects in the data by applying a predetermined joint classifier to at least one feature of a first type, the at least one feature being generated from the data using a first feature extractor, the classification information being based on a probability of each of a plurality of possible classifications;

estimating, for each of the feature types, an improvement in an accuracy of classification for each of the plurality of objects, the estimated improvement being formed using the determined classification information for each of the objects and a type of each of the objects in the data;

selecting features of a further type, from the plurality of feature types, according to the estimated improvement in the accuracy of the classification of each of the objects; and classifying the plurality of objects in the data using the selected features of the further type.

Other aspects are also disclosed.

BRIEF DESCRIPTION OF THE DRAWINGS

At least one embodiment of the present invention will now be described with reference to the following drawings, in which.

DETAILED DESCRIPTION INCLUDING BEST MODE

Context

Figure 1:
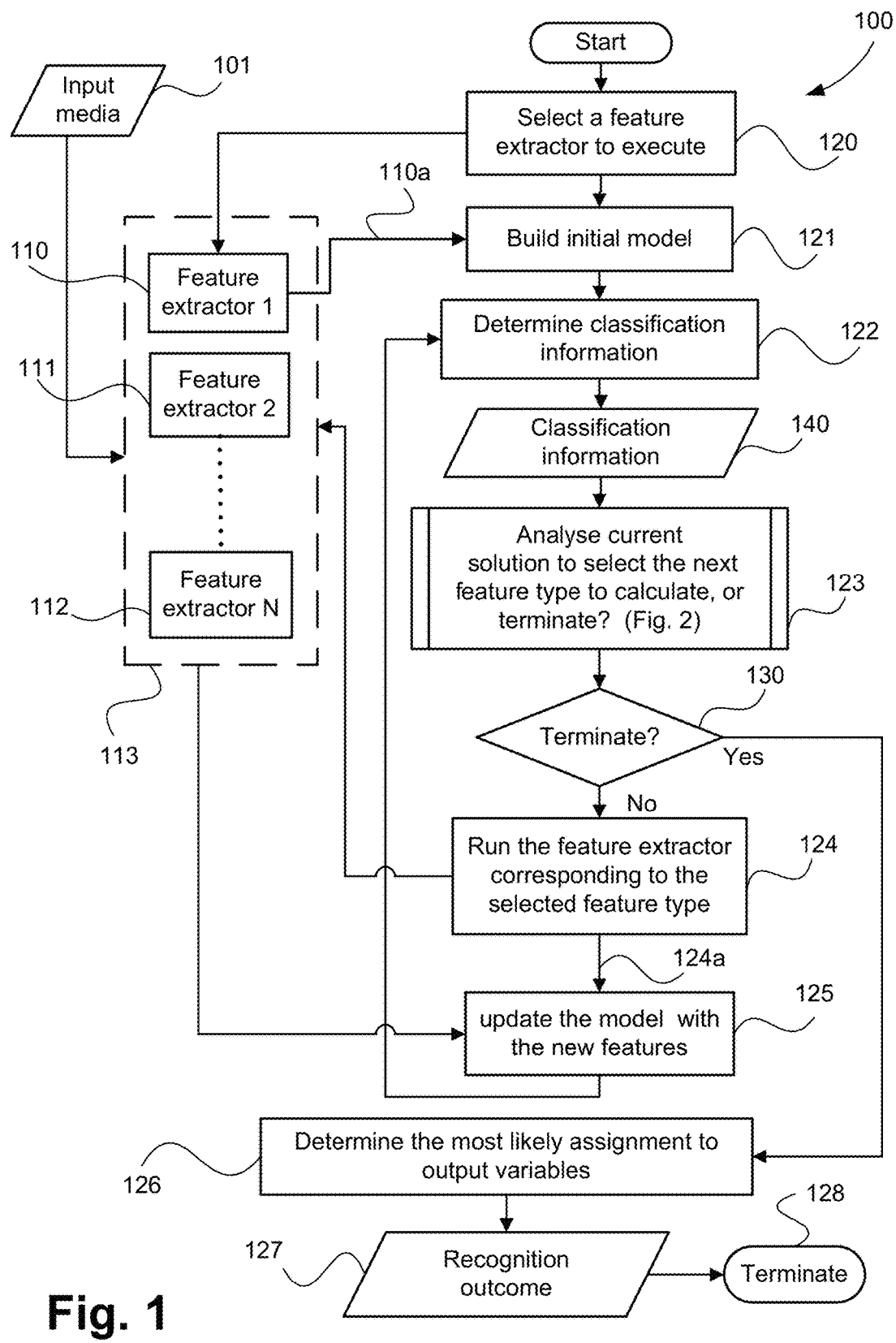
FIG. 1 is a schematic flow diagram illustrating a joint recognition method in which recognition features are dynamically selected from a predefined set of feature types.

Where reference is made in any one or more of the accompanying drawings to steps and/or features that have the same reference numerals, those steps and/or features have for the purposes of this description the same function(s) or operation(s), unless the contrary intention appears.

Overview

The correlation between various semantic concepts in an image or a video recording of a scene may be exploited by recognising the semantic concepts jointly using a probabilistic model. In addition to physical objects, throughout this description, the term object may also be used to refer to other concepts such as scene type, actions, interactions and events which could be associated with the scene or the physical objects in the scene. The term object as used in this description is not intended to be limited to a specific (e.g. graphical) representation of certain pixel data, but such may represent none, some or all objects of an image.

Figure 9:
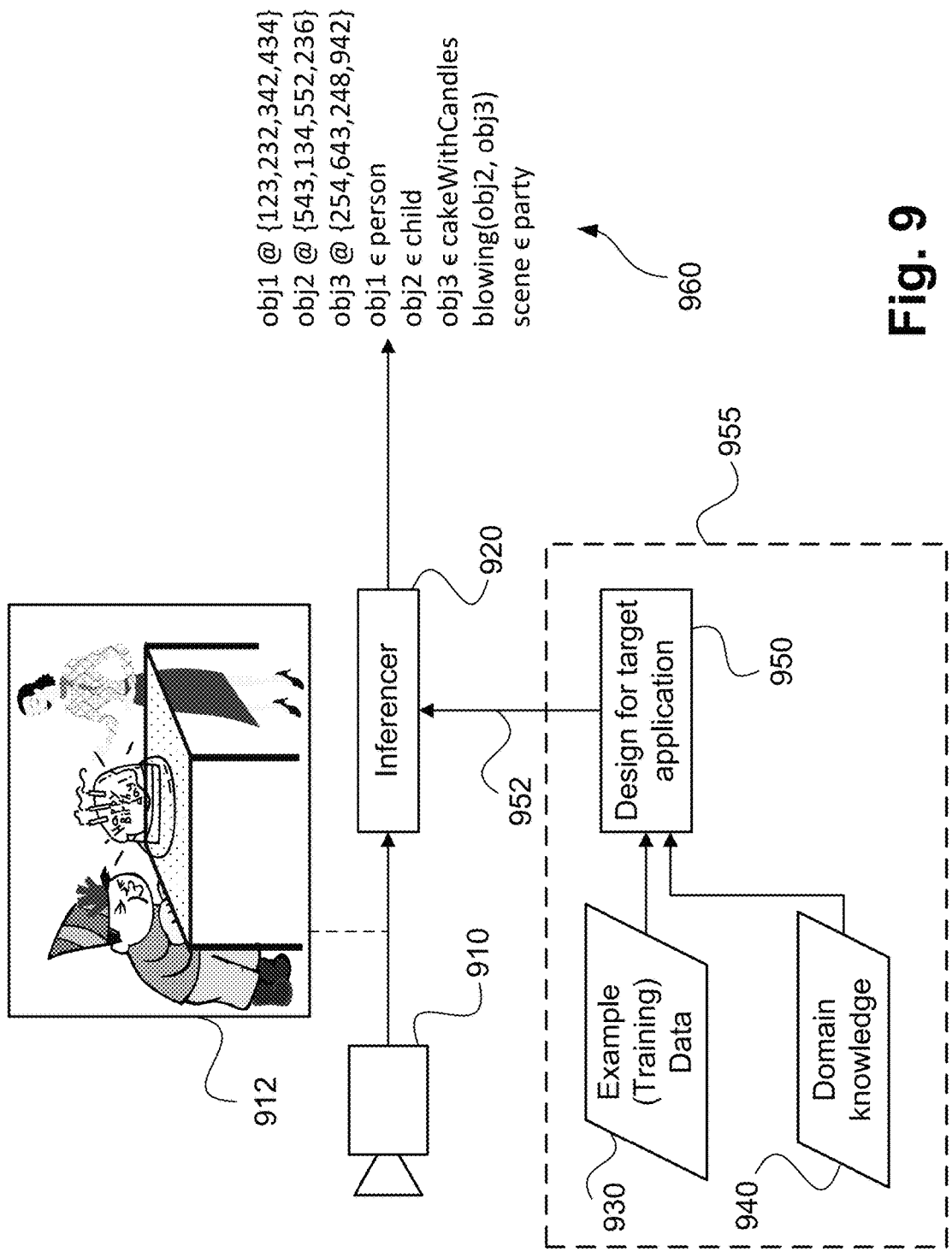
FIG. 9 is a schematic block diagram representation of a computer system upon which described arrangement can be practiced.

The inferencing system described below is for implementing dynamic prioritisation and selection of a preferred feature extractor that determines features with a type that may be used in an inferencer 920 of FIG. 9 during joint recognition of a plurality of concepts. As seen in FIG. 9, the inferencer 920 receives image data 912 from an imaging device 910. The image data 912 may be provided in the form of individual (still) images, or a video stream or sequence of frames, each forming a single image. The inferencer 920 may be optionally configured to operate for a specific purpose or "target application" 955. Where this is desired, example data 930 and/or domain knowledge 940 associated with the target application 955 may each be input to a design module 950 which pre-configures inferencing and regression parameters 952 according to a particular design for the target application. The example data 930 may be training data. The inferencing and regression parameters 952 are then provided to the inferencer 920 for application by the inferencing system to the image data 912, and specifically for use to establish or select feature extractors, more likely to be used for classification of images of the target application. Inferencing and regression parameters 952 are typically all the parameters which have been learned in the training phase 955. The inferencer 920 will use the recursive process 100 shown in FIG. 1 to select a subset of these parameters, depending on the content of the image 912. The inferencer 920 operates to interpret and jointly classify a plurality of objects in the image data 912 and to infer or extract attributes 960 regarding the image data 912 that assists with the subsequent classification, storage, retrieval and use of the image data 912. The inferencer 920 uses the inferencing and regression parameters 952 to select preferred feature extractors that would be more useful for inferring and extracting attributes 960 of the content of the image data 912. In FIG. 9, the attributes 960 exemplified would suggest an image captured at a child's birthday party. The image has three identified objects (person, child, cakeWITHcandles) with each object having a corresponding location established by pixel locations in the image. Two other features are also recognised.

Figure 10A:
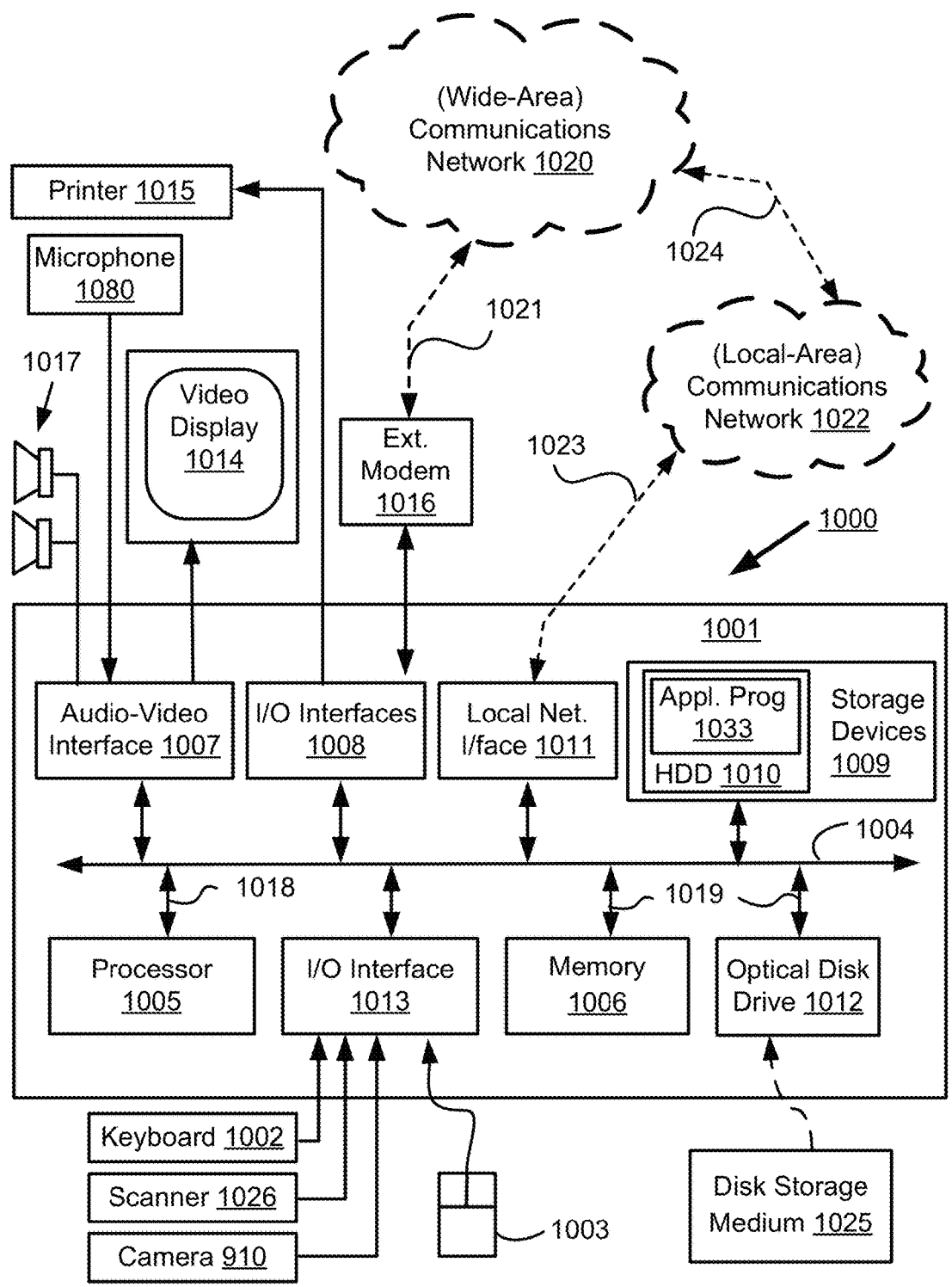
FIGS. 10A and 10B collectively form a schematic block diagram representation of an exemplary computer system upon which the arrangements presently described may be performed.
Figure 10B:
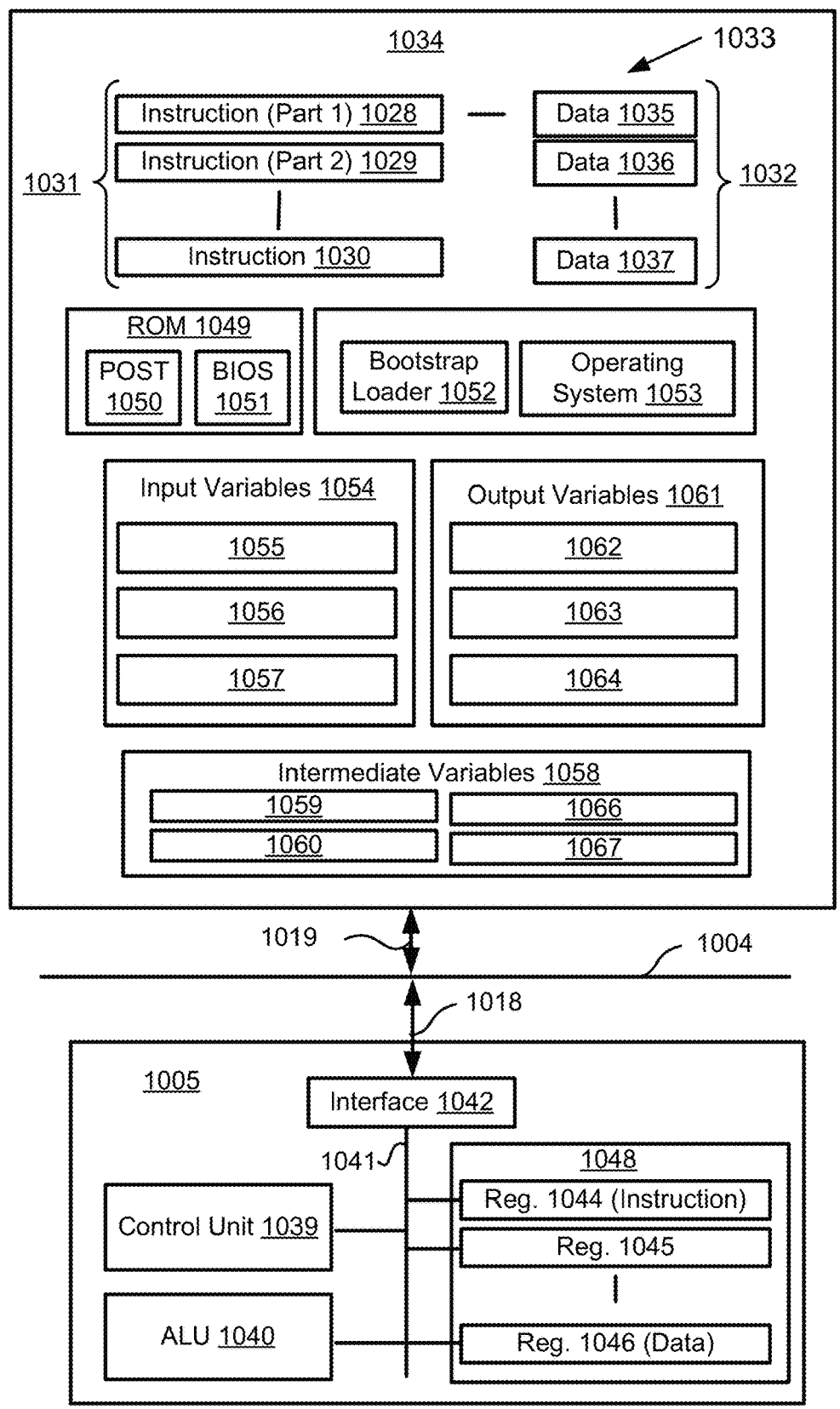

The inferencer 920 is typically implemented by way of a software application executable within a general-purpose computer system 1000, as shown in FIGS. 10A and 10B, upon which the various arrangements described below can be practised.

As seen in FIG. 10A, the computer system 1000 includes: a computer module 1001; input devices such as a keyboard 1002, a mouse pointer device 1003, a scanner 1026, the camera 910, and a microphone 1080; and output devices including a printer 1015, a display device 1014 and loudspeakers 1017. An external Modulator-Demodulator (Modem) transceiver device 1016 may be used by the computer module 1001 for communicating to and from a communications network 1020 via a connection 1021. The communications network 1020 may be a wide-area network (WAN), such as the Internet, a cellular telecommunications network, or a private WAN. Where the connection 1021 is a telephone line, the modem 1016 may be a traditional "dial-up" or ADSL modem. Alternatively, where the connection 1021 is a high capacity (e.g., cable) connection, the modem 1016 may be a broadband modem. A wireless modem may also be used for wireless connection to the communications network 1020.

The computer module 1001 typically includes at least one processor unit 1005, and a memory unit 1006. For example, the memory unit 1006 may have semiconductor random access memory (RAM) and semiconductor read only memory (ROM). The computer module 1001 also includes an number of input/output (I/O) interfaces including: an audio-video interface 1007 that couples to the video display 1014, loudspeakers 1017 and microphone 1080; an I/O interface 1013 that couples to the keyboard 1002, mouse 1003, scanner 1026, camera 910 and optionally a joystick or other human interface device (not illustrated); and an interface 1008 for the external modem 1016 and printer 1015. In some implementations, the modem 1016 may be incorporated within the computer module 1001, for example within the interface 1008. The computer module 1001 also has a local network interface 1011, which permits coupling of the computer system 1000 via a connection 1023 to a local-area communications network 1022, known as a Local Area Network (LAN). As illustrated in FIG. 10A, the local communications network 1022 may also couple to the wide network 1020 via a connection 1024, which would typically include a so-called "firewall" device or device of similar functionality. The local network interface 1011 may comprise an Ethernet circuit card, a Bluetooth™ wireless arrangement or an IEEE 802.11 wireless arrangement; however, numerous other types of interfaces may be practiced for the interface 1011.

The I/O interfaces 1008 and 1013 may afford either or both of serial and parallel connectivity, the former typically being implemented according to the Universal Serial Bus (USB) standards and having corresponding USB connectors (not illustrated). Storage devices 1009 are provided and typically include a hard disk drive (HDD) 1010. Other storage devices such as a floppy disk drive and a magnetic tape drive (not illustrated) may also be used. An optical disk drive 1012 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 1000.

The components 1005 to 1013 of the computer module 1001 typically communicate via an interconnected bus 1004 and in a manner that results in a conventional mode of operation of the computer system 1000 known to those in the relevant art. For example, the processor 1005 is coupled to the system bus 1004 using a connection 1018. Likewise, the memory 1006 and optical disk drive 1012 are coupled to the system bus 1004 by connections 1019. Examples of computers on which the described arrangements can be practised include IBM-PC's and compatibles, Sun Sparcstations, Apple Mac™ or a like computer systems.

The method of joint classification of a plurality of objects in an image may be implemented using the computer system 1000 wherein the processes of FIGS. 1 to 8, to be described, may be implemented as one or more software application programs 1033 executable within the computer system 1000. In particular, the steps of the methods of joint classification are effected by instructions 1031 (see FIG. 10B) in the software 1033 that are carried out within the computer system 1000. The software instructions 1031 may be formed as one or more code modules, each for performing one or more particular tasks. The software may also be divided into two separate parts, in which a first part and the corresponding code modules performs the joint classification methods and a second part and the corresponding code modules manage a user interface between the first part and the user.

The software may be stored in a computer readable medium, including the storage devices described below, for example. The software is loaded into the computer system 1000 from the computer readable medium, and then executed by the computer system 1000. A computer readable medium having such software or computer program recorded on the computer readable medium is a computer program product. The use of the computer program product in the computer system 1000 preferably effects an advantageous apparatus for jointly classifying a plurality of objects in an image.

The software 1033 is typically stored in the HDD 1010 or the memory 1006. The software is loaded into the computer system 1000 from a computer readable medium, and executed by the computer system 1000. Thus, for example, the software 1033 may be stored on an optically readable disk storage medium (e.g., CD-ROM) 1025 that is read by the optical disk drive 1012. A computer readable medium having such software or computer program recorded on it is a computer program product. The use of the computer program product in the computer system 1000 preferably effects an apparatus for jointly classifying a plurality of objects in an image.

In some instances, the application programs 1033 may be supplied to the user encoded on one or more CD-ROMs 1025 and read via the corresponding drive 1012, or alternatively may be read by the user from the networks 1020 or 1022. Still further, the software can also be loaded into the computer system 1000 from other computer readable media. Computer readable storage media refers to any non-transitory tangible storage medium that provides recorded instructions and/or data to the computer system 1000 for execution and/or processing. Examples of such storage media include floppy disks, magnetic tape, CD-ROM, DVD, Blu-ray Disc™, a hard disk drive, a ROM or integrated circuit, USB memory, a magneto-optical disk, or a computer readable card such as a PCMCIA card and the like, whether or not such devices are internal or external of the computer module 1001. Examples of transitory or non-tangible computer readable transmission media that may also participate in the provision of software, application programs, instructions and/or data to the computer module 1001 include radio or infra-red transmission channels as well as a network connection to another computer or networked device, and the Internet or Intranets including e-mail transmissions and information recorded on Websites and the like.

The image data 912 input for inferencing by the application programs 1033 may be provided directly from the camera 910, or alternatively and typically, stored in some fashion, such as upon the HDD 1010 for access by the programs 1033. Other sources of image data can include the disk storage medium 1025, other portable media such as a USB drive, the scanner 1026 or the networks 1020, 1022.

The second part of the application programs 1033 and the corresponding code modules mentioned above may be executed to implement one or more graphical user interfaces (GUIs) to be rendered or otherwise represented upon the display 1014. Through manipulation of typically the keyboard 1002 and the mouse 1003, a user of the computer system 1000 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 1017 and user voice commands input via the microphone 1080.

FIG. 10B is a detailed schematic block diagram of the processor 1005 and a "memory" 1034. The memory 1034 represents a logical aggregation of all the memory modules (including the HDD 1009 and semiconductor memory 1006) that can be accessed by the computer module 1001 in FIG. 10A.

When the computer module 1001 is initially powered up, a power-on self-test (POST) program 1050 executes. The POST program 1050 is typically stored in a ROM 1049 of the semiconductor memory 1006 of FIG. 10A. A hardware device such as the ROM 1049 storing software is sometimes referred to as firmware. The POST program 1050 examines hardware within the computer module 1001 to ensure proper functioning and typically checks the processor 1005, the memory 1034 (1009, 1006), and a basic input-output systems software (BIOS) module 1051, also typically stored in the ROM 1049, for correct operation. Once the POST program 1050 has run successfully, the BIOS 1051 activates the hard disk drive 1010 of FIG. 10A. Activation of the hard disk drive 1010 causes a bootstrap loader program 1052 that is resident on the hard disk drive 1010 to execute via the processor 1005. This loads an operating system 1053 into the RAM memory 1006, upon which the operating system 1053 commences operation. The operating system 1053 is a system level application, executable by the processor 1005, to fulfil various high level functions, including processor management, memory management, device management, storage management, software application interface, and generic user interface.

The operating system 1053 manages the memory 1034 (1009, 1006) to ensure that each process or application running on the computer module 1001 has sufficient memory in which to execute without colliding with memory allocated to another process. Furthermore, the different types of memory available in the system 1000 of FIG. 10A must be used properly so that each process can run effectively. Accordingly, the aggregated memory 1034 is not intended to illustrate how particular segments of memory are allocated (unless otherwise stated), but rather to provide a general view of the memory accessible by the computer system 1000 and how such is used.

As shown in FIG. 10B, the processor 1005 includes a number of functional modules including a control unit 1039, an arithmetic logic unit (ALU) 1040, and a local or internal memory 1048, sometimes called a cache memory. The cache memory 1048 typically includes a number of storage registers 1044-1046 in a register section. One or more internal busses 1041 functionally interconnect these functional modules. The processor 1005 typically also has one or more interfaces 1042 for communicating with external devices via the system bus 1004, using a connection 1018. The memory 1034 is coupled to the bus 1004 using a connection 1019.

The application program 1033 includes a sequence of instructions 1031 that may include conditional branch and loop instructions. The program 1033 may also include data 1032 which is used in execution of the program 1033. The instructions 1031 and the data 1032 are stored in memory locations 1028, 1029, 1030 and 1035, 1036, 1037, respectively. Depending upon the relative size of the instructions 1031 and the memory locations 1028-1030, a particular instruction may be stored in a single memory location as depicted by the instruction shown in the memory location 1030. Alternately, an instruction may be segmented into a number of parts each of which is stored in a separate memory location, as depicted by the instruction segments shown in the memory locations 1028 and 1029.

In general, the processor 1005 is given a set of instructions which are executed therein. The processor 1005 waits for a subsequent input, to which the processor 1005 reacts to by executing another set of instructions. Each input may be provided from one or more of a number of sources, including data generated by one or more of the input devices 1002, 1003, data received from an external source across one of the networks 1020, 1022, data retrieved from one of the storage devices 1006, 1009 or data retrieved from a storage medium 1025 inserted into the corresponding reader 1012, all depicted in FIG. 10A. The execution of a set of the instructions may in some cases result in output of data. Execution may also involve storing data or variables to the memory 1034.

The disclosed joint classification arrangements use input variables 1054, which are stored in the memory 1034 in corresponding memory locations 1055, 1056, 1057. The joint classification arrangements produce output variables 1061, which are stored in the memory 1034 in corresponding memory locations 1062, 1063, 1064. Intermediate variables 1058 may be stored in memory locations 1059, 1060, 1066 and 1067.

Referring to the processor 1005 of FIG. 10B, the registers 1044, 1045, 1046, the arithmetic logic unit (ALU) 1040, and the control unit 1039 work together to perform sequences of micro-operations needed to perform "fetch, decode, and execute" cycles for every instruction in the instruction set making up the program 1033. Each fetch, decode, and execute cycle comprises:

(i) a fetch operation, which fetches or reads an instruction 1031 from a memory location 1028, 1029, 1030;

(ii) a decode operation in which the control unit 1039 determines which instruction has been fetched; and (iii) an execute operation in which the control unit 1039 and/or the ALU 1040 execute the instruction.

Thereafter, a further fetch, decode, and execute cycle for the next instruction may be executed. Similarly, a store cycle may be performed by which the control unit 1039 stores or writes a value to a memory location 1032.

Each step or sub-process in the processes of FIGS. 1 to 8 is associated with one or more segments of the program 1033 and is performed by the register section 1044, 1045, 1046, the ALU 1040, and the control unit 1039 in the processor 1005 working together to perform the fetch, decode, and execute cycles for every instruction in the instruction set for the noted segments of the program 1033.

Although the computing system 1000 discussed above is a significantly sized apparatus, the arrangements may alternatively and equivalently be implemented in an embedded computing system, for example using processor devices of the imaging device 910 (i.e. within the camera). Such can permit generally real-time analysis of images at the time of, or during, image capture, and ready storage of the extracted features as metadata with the captured image data. The inferencing system is useful when there is a constraint on computation resources caused by a limitation of available computation power, as is often the case with embedded camera systems, a limitation in recognition time, as also occurs with embedded camera systems, or more likely, a combination of the two. As a result of the computation resource constraint determining all features of different desired feature types is not generally feasible. The inferencing system may also be beneficial when the available computational resources are not known when a recognition process is started. Another possible advantage of the inferencing system is to allow energy conservation by prioritising calculation of selected feature types, and therefore, avoid unnecessary or less valuable calculations. This is also significant in embedded portable systems.

The described inferencing system uses discrete Conditional Makov Random Fields (CRF) for probabilistic joint classification. A discrete CRF specifies a probability distribution over a set of N discrete output random variables $Y_1$, $Y_2$, ..., $Y_N$ given the values of M input variables $X_1$, $X_2$, ..., $X_M$, using K potential functions $\psi_1, \psi_2, ..., \psi_K$. Each discrete random variable $Y_i$ is called an output random variable, and is associated with a set of possible states. Each potential function $\psi_k$ is associated with one or more of variables $Y_1, Y_2, ..., Y_N$. Each potential function $\psi_k$ specifies a non-negative value for each combination of states of the variables associated with the potential function. Variables $X_1, X_2, ..., X_M$ are input to the model and their values determine the values of the potential functions $\psi_1, \psi_2, ..., \psi_K$.

The probability distribution specified by such a CRF is given by:

$$P(Y = y \mid X = x) = \frac{1}{Z(x)} \prod_{k=1}^{K} \psi_k(Y_k = y_k \mid X_k = x_k) \quad \text{(Eq. 1)}$$

where:
(i) Y is the set of N output random variables $Y_1$, $Y_2$, ..., $Y_N$, i.e. $Y = Y_1, Y_2, ..., Y_N$,
(ii) y is an assignment of states to output variables
(iii) X is the set of input variables $X_1, X_2, ..., X_M$, i.e., $X = X_1, X_2, ..., X_M$,
(iv) x is the value of the variables X in the current model,
(v) P(Y=y|X=x) is the probability of Y having assignment y, given an assignment X=x of input variables,
(vi) Z(x) is the normalization factor and is the sum of the product of the potential functions $\psi_1, \psi_2, ..., \psi_K$ for all possible states of the CRF, given an assignment X=x of input variables.

In the context of CRF models:
(i) A solution space consists of all possible states of the probabilistic model, each state being a combination of possible classification labels for each variable in the model;
(ii) A state space consists of all possible states of a random variable, each state representing a possible classification label for the variable;
(iii) Solving a probabilistic model is the process of finding a most probable state in the solution space of the probabilistic model; and
(iv) Finding marginal probabilities of a CRF model is the process of finding a marginal distribution for all the output variables in the CRF; where finding the marginal distribution for each variable is the process of determining a probability of the variable being classified as any of the states in its state space, without reference to the values of the other variables in the CRF.

In the arrangements described in the present disclosure, each output variable $Y_i$ is associated with an object in the image of a scene. Input variables $X_1, X_2, ..., X_M$ are the features of various feature types, used for classification, and the values of the potential functions $\psi_1, \psi_2, ..., \psi_K$ for any given values of the features x are determined from parameter optimization on a training set during a training phase. One example of the inferencing system performs parameter optimisation using gradient ascent on an approximation of the log-likelihood of the ground truth classifications of the training set. Other implementations can use gradient ascent on the pseudo-log-likelihood, or the gradient ascent on the exact log-likelihood to perform parameter optimization.

Upon the commencement of a joint classification process, the value of an input variable is not known. This is because no feature extractor has yet been executed to give an initial feature establishing an input variable. The first feature extractor may be selected using the inferencing parameters 952, or using prior/domain knowledge for the example being processed. However, where prior/domain knowledge is not available, the inferencing system typically selects a highly generic first feature extractor to commence a coarse classification of the image, and then starts selecting feature extractors from the second feature extractor and onward, using at least the calculated features of the first and subsequent types. The choice of second and subsequent feature extractors is non-deterministic and depends on the content of the image 912. When the value of an input variable is not known, as discussed above, one implementation determines the corresponding unary potential function values as the weighted average of the values of that potential function when the unknown feature value is replaced with each of the possible states that the undetermined input feature can take; i.e., $$\psi_k(Y_k=y_k|X_k=x_k)=\Sigma_{x'_k \in X'_k} P(x'_k) \cdot \psi_k(T_k=y_k|X_k=x'_k) \quad \text{(Eq. 2)}$$

where $x_k$ contains at least one input variable whose value is not determined. $X'_k$ is an elaboration of $x_k$ in which each of the undetermined feature values is replaced with all of its possible states. $P(x'_k)$ is the prior probability that once the value of the undetermined features are determined, the value of the input would be $x'_k$. The prior probability is that which is expected without observing the particular input. Other implementations, may approximate the unary potential function corresponding to an undetermined input variable differently.

Figure 7:
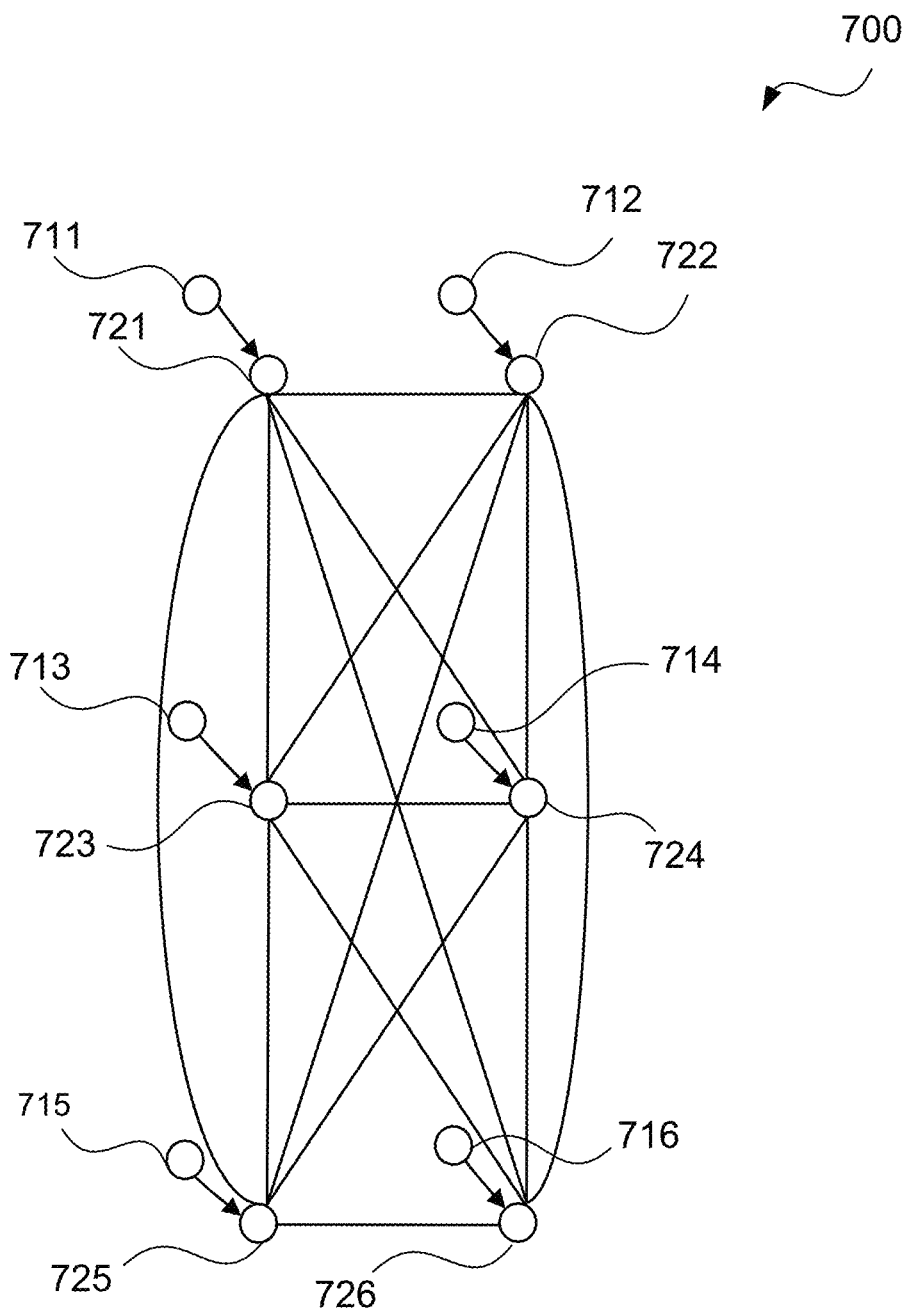
FIG. 7 illustrates a graph representing a Conditional Markov Random Field used for jointly classifying six concepts.

FIG. 7 illustrates an example CRF 700 for joint recognition of objects from an image of a scene. In this example, the image of the scene contains up to two people and output variables 723 and 724 represent the locations of these two people, being the pixel grid locations of the centre of each group (blob) of pixels in the image 101 that represents each person, or the pixel grid locations of a bounding box which tightly contain each group (blob) of pixels in the image 101 that represents each person. The output variables 723, 724 are therefore objects representing the two people. The state space for these variables is a finite set of quantized locations in the input image of the scene, plus an additional state of 'None' representing a case where the detection outcome is that such a person does not appear in the input image. The output variables 725 and 726 are for the actions that the people, positioned at the location variables 723 and 724, are performing in the scene. In this example, the output variables 725 and 726 each refer to a state space containing actions of interest such as walking, running, jumping, falling and a special state of 'others.' The state 'others' in the state space of the variables 725 and 726 represents all the other possible actions which are not of interest for the current application, and the case where there is no action. Variables 713 and 714 are the sets of input features which are directly used for people recognition, i.e., the state of people location variables 723 and 724 are conditioned on the value of the input features 713 and 714, respectively. A feature is 'indirectly' used for recognition of a concept (Concept-A), when that feature is used for recognition of a different concept (Concept-B), but there is a dependency between Concept-A and Concept-B. In the FIG. 7, there is a directed arrow form 713 to 723 which is used to represent that the feature is directly used. When features of the same type are determined for the whole image frame, regardless of the number and location of possible people, the variables 713 and 714 will have the same feature values. Variables 715 and 716 are input features used for action recognition. Variable 721 is for classifying the scene type, and the state space for this variable contains scene categories such as 'home', 'office', 'train station', 'park', 'beach' and 'other'. In a similar manner to the 'other' action, the state 'other' in the state space of variable 721 represents all the other possible scene types which are not of interest for this application. Variable 711 is the input feature which is used for scene categorisation. Variable 722 is for classifying the image for the event which is captured in the image of the scene. The state space for the variable 722 contains 'party', 'sport competition' and 'others'. A variable 712 represents a set of input features used for recognition of the event which is captured in the image or video of the scene.

The CRF represented in FIG. 7 contains only unary and binary potential functions. A unary potential function is associated with a single output variable $Y_i \in \{Y_1, Y_2, \ldots, Y_N\}$, and specifies a non-negative value for each state of the corresponding output variable. Unary potential functions are conditioned on the value of input features. A binary potential function is associated with a pair of output variables $Y_i$, $Y_j \in \{Y_1, Y_2, \ldots, Y_N\}$ $i \neq j$, and specifies a non-negative value for each pair of states of the corresponding output variables. The binary potential functions are represented with undirected edges in FIG. 7. A binary potential function can interchangeably be called pair-wise potential function. The unary potential functions are represented with directed edges, each from an input variable to the corresponding output variable. Each variable of FIG. 7 has a type attribute, where the type of a variable is defined by its state space. Two or more variables with the same state space are considered to be of the same type. In the implementations described, the same unary or binary potential functions are used between variables with the same type. For example, the same potential function is used for modelling the correlation between variables 721 and 723, and 721 and 724. Similarly, the same potential function is used between variable 721 and 725 and 721 and 726. In FIG. 7, when the same reference number is used for more than one edge, those edges represent the same potential function.

Figure 8:
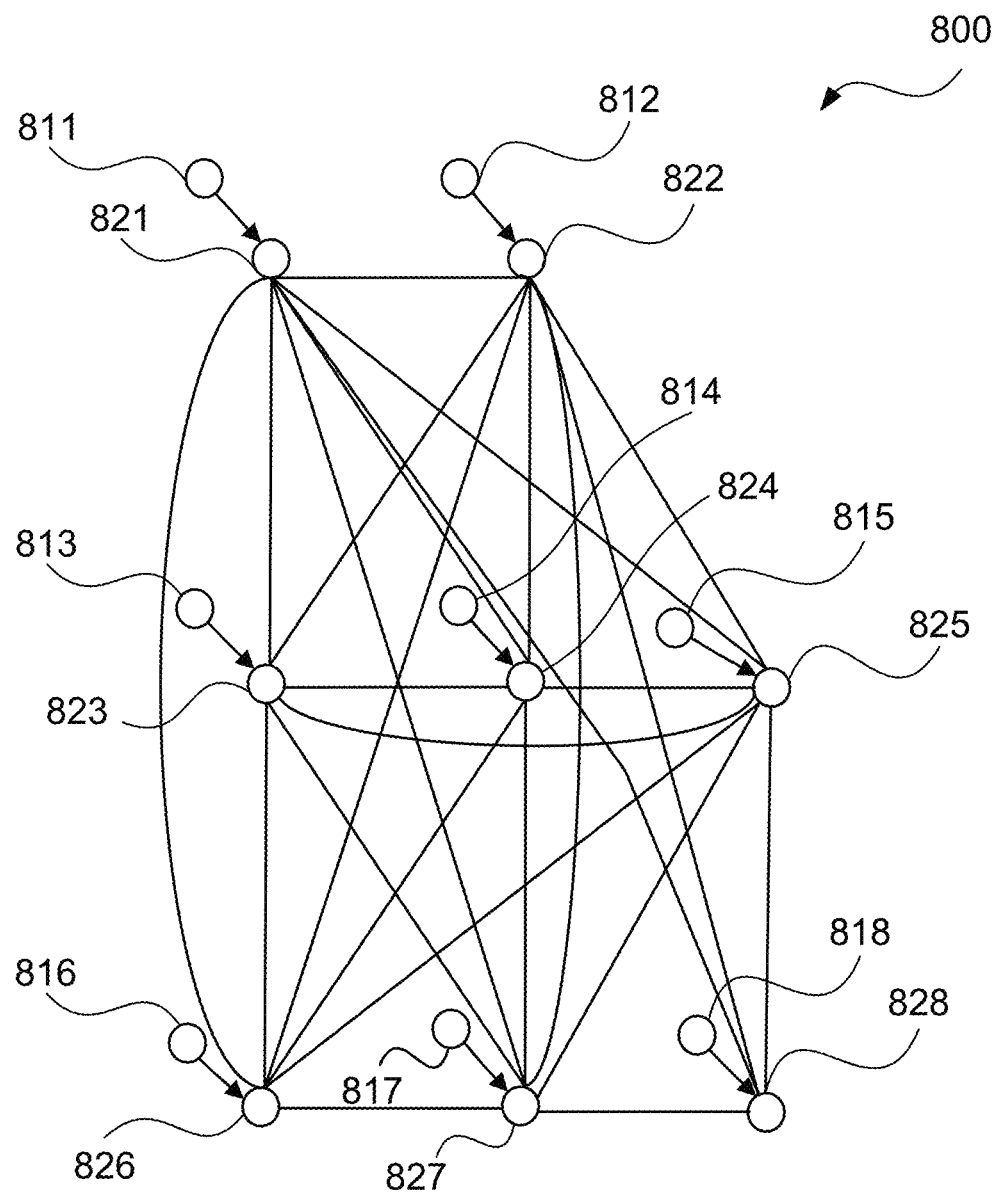
FIG. 8 illustrates a graph representing a Conditional Markov Random Field used for jointly classifying eight concepts.

Similar to FIG. 7, FIG. 8 illustrates a CRF 800 for joint recognition of objects in an image of a scene. In this example, the image of the scene contains a maximum of 3 people represented as variables 823, 824 and 825. This number is not representative of the exact number of people, but rather the upper limit of the number of people in the image. Respectively, the CRF 800 contains 3 variables 826, 827 and 828 for the action performed by people represented as variables 823, 824 and 825, respectively. Variables 821 and 822 are similar to variable 721 and 722. The CRFs shown in FIG. 7 and FIG. 8 contain the same type of variables. Therefore, the CRF of FIG. 8 can be built using the same unary and binary potential functions as are used in FIG. 7. Variables 811, 812, 813, 814, 815, 816, 817 and 818 are the input features.

First Implementation

With reference to FIGS. 1 to 6 an implementation for dynamically selecting features to determine for joint recognition of objects will now be described.

FIG. 1 is a top level schematic flow diagram illustrating an inferencing process 100 for joint recognition of objects, which also selects the recognition features dynamically. The process 100 is preferably implemented as one of the application programs 1033. Input media 101 is an image or a video capture of a scene. The output of the process 100 is a set of classification labels, corresponding to the recognition outcomes for objects in the scene represented by the image 101. In this example, the input media 101 is processed by a set of feature extractors 113, made up of feature extractors 110, 111 to 112. Each feature extractor of the set 113 is applied to the input media 101 to generate feature values for the feature type with which the particular feature extractor is associated. The feature values may simply be referred to as 'features'. Feature values generated by different ones of the feature extractors 110-112 are considered to have different types. Some feature types may be relatively simple and provide simple feature values for which basic classification may be performed. Other feature types may be more complex, potentially involving more processing, but which can afford greater classification detail.

At a pixel level, feature types and their associated feature extractors can include STIP, HOG, SIFT, RGB, HSV SIFT and colour moments, as discussed above. At higher levels, feature types can include any generic pre-trained classifiers such as a generic face recognition, scene recognition or action recognition. The high level feature types can also include pre-trained classifiers for specific objects, such as a face recognition module which has been trained before for recognising the face of a particular person. The recognition scores or the recognition tags generated by these high level feature extractors are the feature values that would be used to determine the corresponding potential functions $\psi_k$.

At a feature selection step 120, a first feature extractor 110 is selected and executed. The feature selection step 120 determines a first feature value of a first feature type. The first feature extractor 110 is desirably selected based on domain knowledge, or by optimisation of the inferencing performance using an existing training dataset, as discussed above for the inputs 930 and 940. A training dataset contains samples, generated by the feature extractors of the feature extractor set 113 from images of similar scenes, as well as ground truth annotations for objects of interest located in the images. The first feature extractor may be a high level feature extractor type providing general high level information about the scene, e.g. a high level feature extractor classifying the scene type, for which the feature values could be either "indoors" or "outdoors", determined from the spectrum and spread of light across the image). A value of "indoors" may indicate a relatively high likelihood of a family event, such as a birthday party, in contrast to a sporting event as such are typically held outdoors. The same feature type "scene type" may also have other values, such as "day" and "night" to potentially further qualify the current level of classification.

After determining the feature value 110a of the first type, an initial CRF model is built in model building step 121. The model building step 121 determines values of the potential functions of the CRF using the determined feature values 110a. The model building step involves evaluation of Equation (1) above, which in the initial instance is bound solely by the first feature type and values.

A classification step 122 determines 'classification information' which is the marginal probabilities B, or an approximation of the marginal probabilities, of the CRF. In other words, classification information is a marginal distribution (or an approximation) over states for each output variable of the CRF, i.e., $B=\{B_1, B_2, \ldots, B_N\}$, where $B_i$ is the exact or approximate marginal distribution of variable $Y_i$. The classification step 122 outputs classification information 140. Using the above example, the first feature of "indoors" may give a probability of 0.8 that the image is of a birthday party, and a probability of 0.2 that the image is of a sporting event.

After finding the marginal probabilities, process 100 proceeds to an analysis step 123 which analyses the classification information 140 and decides which of the remaining feature extractors 113 should be executed next. For the above example, further feature extractors available for execution could include {"birthday party", "wedding party", "cooking", "toys", "games", "football", "sailing", and "swimming"} classifiers, to name just a few. Based on the "night indoors" first feature value, marginal probabilities for this set could be {0.35, 0.25, 0.15, 0.15, 0.05, 0.03, 0.01 and 0.01}, respectively.

The analysis step 123 determines an estimated benefit of executing any of the feature types of the unexecuted feature extractors 113. The analysis step 123 sets a termination flag to 'true' when a maximum of the estimated benefit of determining an undetermined feature types is smaller than a threshold. The process 100 will terminate if the benefit of executing a feature extractor is too low. A threshold is selected based on a balance between saving computational resources and improving classification accuracy. The analysis step 123 also sets the termination flag to true when all the feature extractors are executed. Otherwise the termination flag is set to false.

When the termination flag is true, a decision step 130 terminates the process of determining more feature values, and the process 100 continues to an assignment step 126. The assignment step 126 concludes the inferencing process by solving the CRF for the most likely state, i.e., Maximum a posterior (MAP) and jointly determining the classification labels for all the variables in the model.

When the termination flag is false, a feature extractor corresponding to a feature type with the largest expected accuracy improvement will be executed on the input media 101 in execution step 124. In the present example, this would be the feature extractor for "birthday party". The outputs of the execution step 124 are feature values 124a for the feature type with the largest expected accuracy improvement.

A model update step 125 then updates the corresponding CRF potential functions based on the feature values 124a determined in the execution step 124. This involves re-evaluating Equation (1) using the second (further) feature type and the corresponding returned feature values thereof to provide an updated model. The process 100 then returns back to the classification step 122 to determine the classification information 140 for the updated CRF model.

Figure 2:
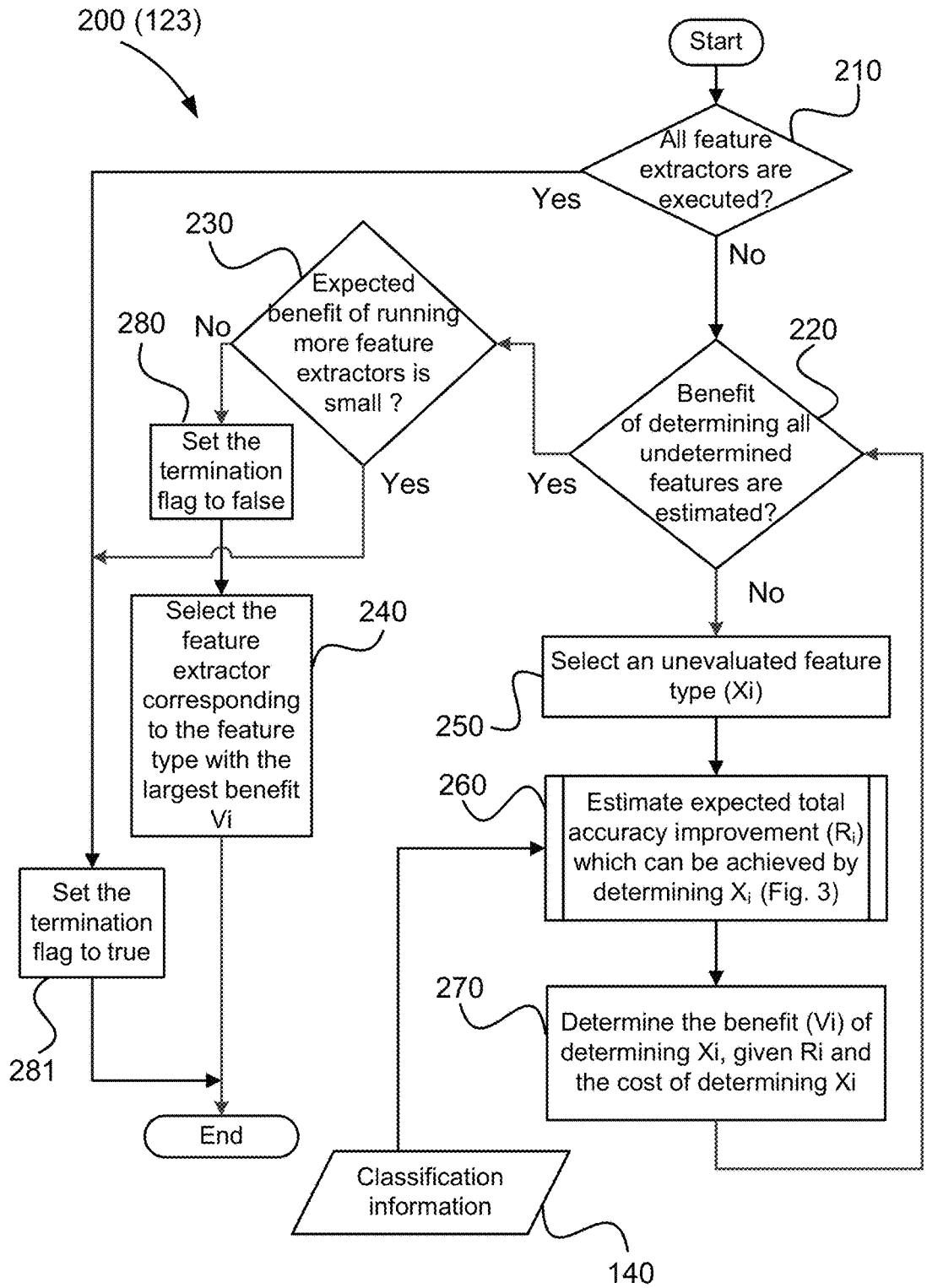
FIG. 2 is a schematic flow diagram illustrating a method of selecting a next feature extractor to execute, given determined classification information.

Once the loop of FIG. 1 has been traversed at least twice, the operation of at least two of the feature extractors and the model and classification performed, such represents the application of a predetermined joint classifier to features of the input image. "Predetermined" is a reference to the model parameters (i.e., inference and regression parameters 952) are determined beforehand (i.e., in training phase) using the training data 930, and possibly domain knowledge 940. "Joint classifier" is a reference to the model built in step 121 and further updated in step 125 is a CRF model which can be used to jointly infer about multiple semantic concepts (e.g., scene type, objects type and actions as in the CRF model shown in FIG. 7). The inferencing and regression parameters 952 are used in the processing steps 121, 123 and 125 but are not shown in FIG. 1 for the sake of clarity. The analysis step 123 will now be described in more details with reference to a preferred analysis process 200 as shown in FIG. 2. The analysis process 200 is typically implemented as one of the applications programs 1033 and starts with a feature extractor check step 210 where a check is performed to see if all the feature extractors are executed and, therefore, that all possible feature types have been determined. When the outcome of the check is positive, the process 200 continues to a set flag true step 281 where the termination flag is set to 'true'. When the outcome of the feature extractor check step 210 is negative, the analysis process 200 continues to a benefit check step 220.

The benefit check step 220 checks whether or not the expected accuracy improvement has been estimated for all the undetermined feature types of the feature extractors 113. When an outcome of the check performed in the benefit check step 220 is negative, the process 200 continues to a select feature type step 250. The select feature type step 250 selects an undetermined or unevaluated feature type for which the expected accuracy improvement is yet to be estimated. For reference, the undetermined feature type is referred to as $X_i$. An estimate accuracy step 260 then follows to estimate an expected accuracy improvement ($R_i$) which may be achieved by using the unevaluated feature type $X_i$. Step 260 makes use of the classification information 140 determined in step 122. The feature value for unevaluated feature type $X_i$ is determined by executing the corresponding feature extractor. However, before this is done, step 260 determines whether it is worth running the selected feature extractor.

After estimating the expected total accuracy improvement in step 260, a benefit determination step 270 determines a benefit ($V_i$) of determining the unevaluated feature type $X_i$ given the expected accuracy improvement $R_i$ and a computation cost $C_i$ of determining the unevaluated feature type $X_i$. In one specific implementation, the benefit $V_i$ is determined by normalising the expected accuracy improvement $R_i$ with the computation cost $C_i$, such that the benefit is a measure of the expected accuracy improvement per computation Cost—

$$V_i = \frac{R_i}{C_i}.$$

Other implementations may determine the benefit $V_i$ using a different trade-off across expected total accuracy improvement $R_i$ and computation cost $C_i$. After the benefit determination step 270, execution of process 200 returns to the benefit check step 220.

When the outcome of the check performed in the benefit check step 220 is positive, execution of the analysis process 200 continues to a benefit test step 230. The benefit test step 230 finds a maximum of the benefit $V_i$ values for each of the undetermined feature types. When the maximum of the benefit is smaller than a threshold, the benefit test step 230 concludes that there is no benefit in determining any more features and execution of the analysis process 200 continues to the set the termination flag true step 281; otherwise, the analysis process 200 continues to a set the termination flag false step 280. The threshold used in the benefit test step 230 may be selected based on a balance between saving computational resources and any improvement in classification accuracy. If computational resources are limited, then the improvement in classification accuracy would need to be large before the benefit test step 230 would consider determining the unevaluated feature type $X_i$. The set flag false step 280 sets the termination flag to 'false' and the analysis process 200 continues to a select feature extractor step 240. The select feature extractor step 240 selects the feature extractor corresponding to the feature type with the largest benefit $V_i$.

Figure 3:
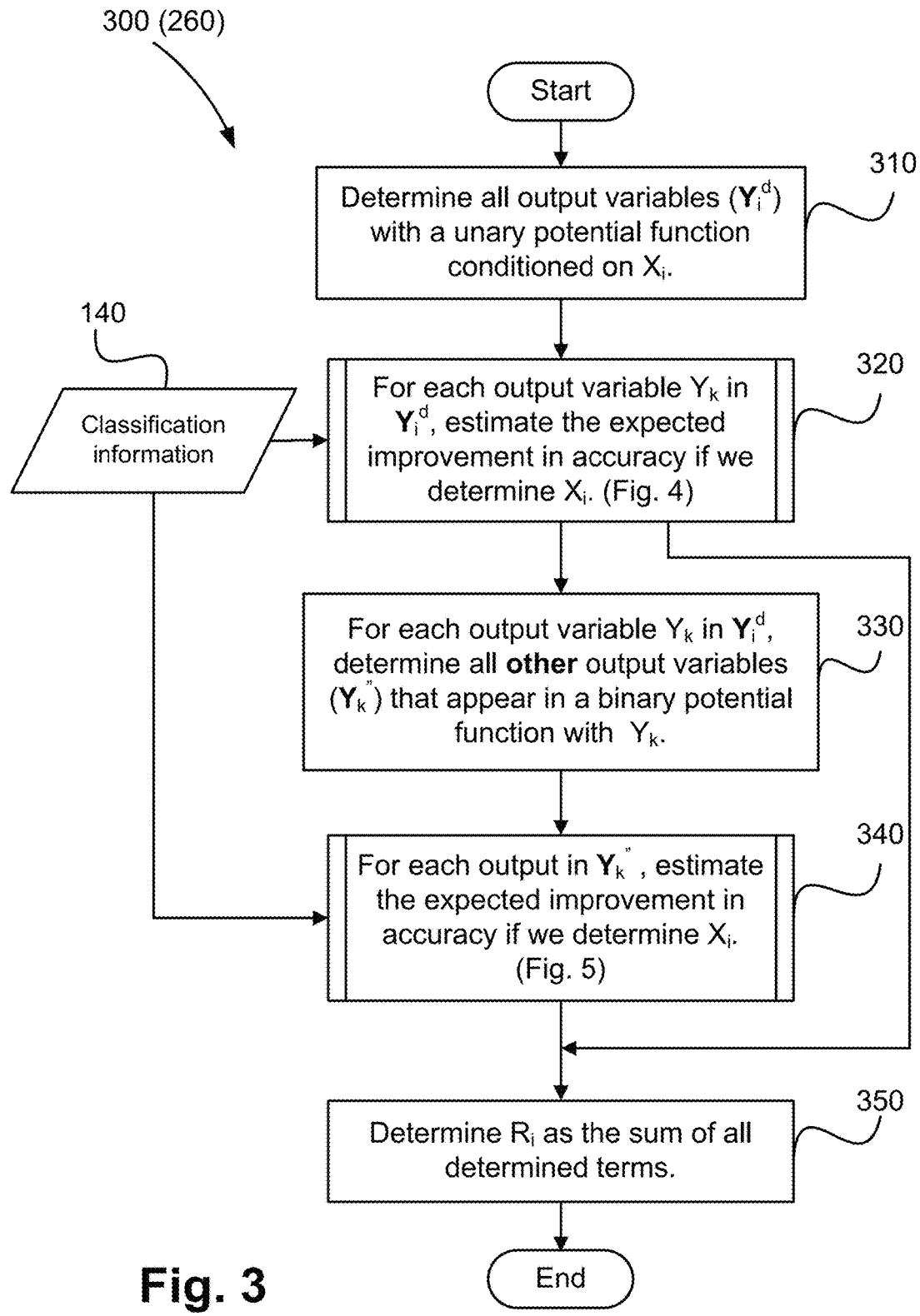
FIG. 3 is a schematic flow diagram illustrating a method of estimating a total accuracy improvement which may be achieved by executing a feature extractor.

The estimate accuracy step 260 will now be described in more detail with reference an exemplary estimation process 300 shown in FIG. 3. For the unevaluated feature type $X_i$, the estimate accuracy step 260 determines an estimate of expected accuracy improvement ($R_1$) which is expected to be achieved if the unevaluated feature type $X_i$ is determined. Note that the expected accuracy improvement is determined without determining the feature value of the unevaluated feature type $X_i$. The estimate step 260 uses classification information 140 determined in the classification step 122.

A determine variables step 310 is a first step in the estimation process 300 of estimating an accuracy improvement. The determine variables step 310 determines a set of output variables $Y_i^d$ which appear in a unary potential function conditioned on the value of the unevaluated feature type $X_i$. A 'estimate direct accuracy improvement' step 320 is an accuracy improvement estimation process which estimates an expected accuracy improvement for each output variable $Y_k$ in the set of output variables $Y_i^d$ ($Y_k \in Y_i^d$) using the classification information determined in the classification step 122 of the process 100. The expected accuracy improvement for each output variable $Y_k$ in the set of output variables $Y_i^d$, due to determining a feature value of feature type $X_i$, is referred to as 'direct' accuracy improvement. The estimate direct accuracy improvement step 320 will be explained in further detail below with reference to FIG. 4.

For each of the output variables $Y_k \in Y_i^d$, an estimate remaining variables step 330 finds all binary potential functions which include the output variable $Y_k$. Each output variable $Y_k$ is evaluated in turn. The binary functions that are located contain the output variable $Y_k$ and other variables which are from a set of all the other variables $Y''_k$.

An 'estimate indirect accuracy improvement' step 340 then follows to implement an accuracy improvement estimation process which estimates an expected accuracy improvement for each output variable $Y_p$ in the set of all other variables $Y''_k$ ($Y_p \in Y''_k$) with the binary potential functions containing $Y_k$. The expected accuracy improvement for each output variable $Y_p$ in the set of other variables $Y''_k$, due to determining a feature value of feature type $X_i$, is referred to as indirect accuracy improvement. The accuracy improvement is determined using the classification information 140 determined in the classification step 122 of the process 100. Details of the estimate indirect accuracy improvement step 340 will be discussed in greater detail below in reference to FIG. 5.

A determine final improvement step 350 then determines a total accuracy improvement $R_i$ as the sum of all the expected direct and indirect accuracy improvement terms determined in the estimate direct accuracy improvement step 320 and the estimate indirect accuracy improvement step 340.

Figure 4:
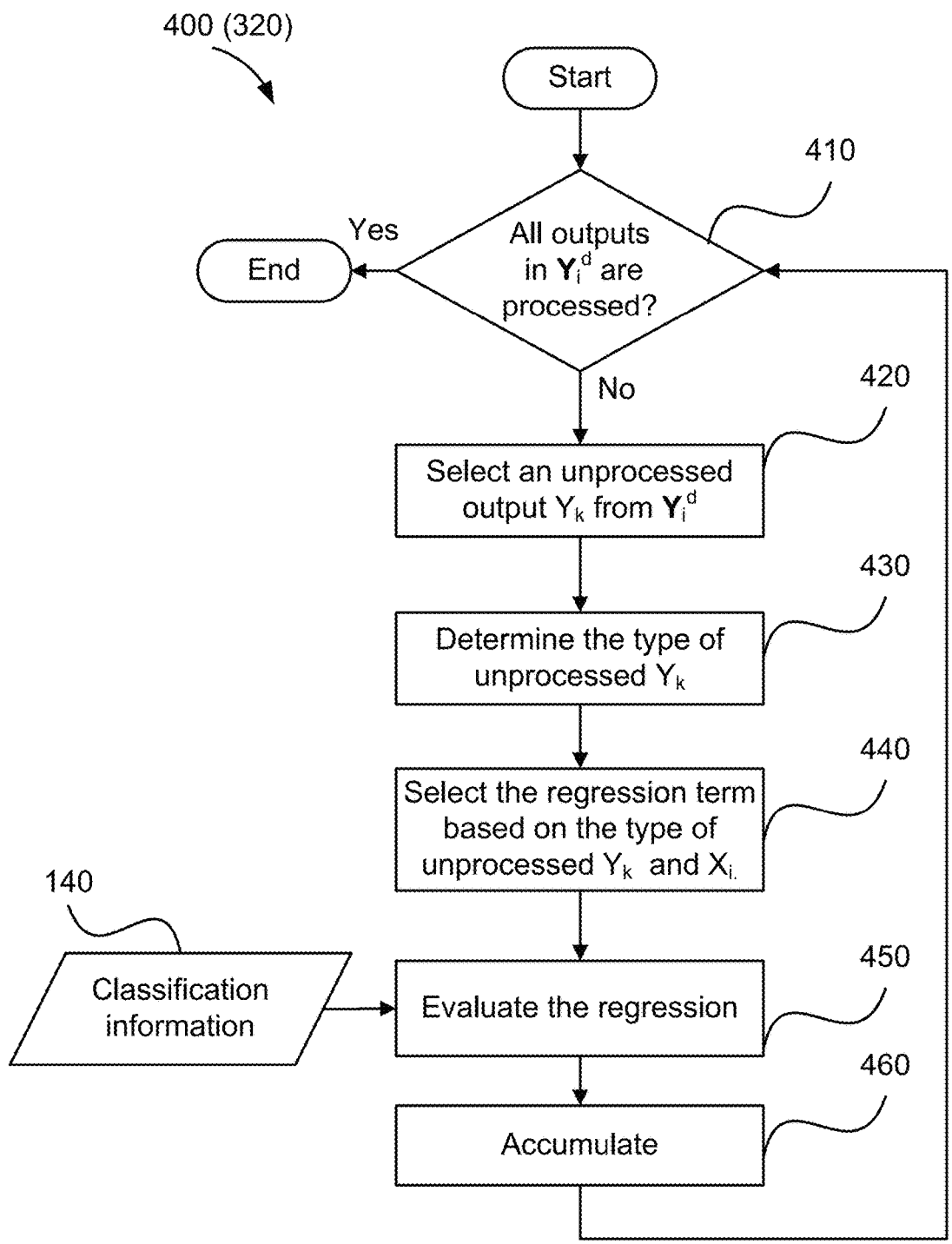
FIG. 4 is a schematic flow diagram illustrating a method of estimating an accuracy improvement which may be achieved by executing a feature extractor of a particular type, when the output of the feature extractor is directly used in the recognition of a concept.
Figure 5:
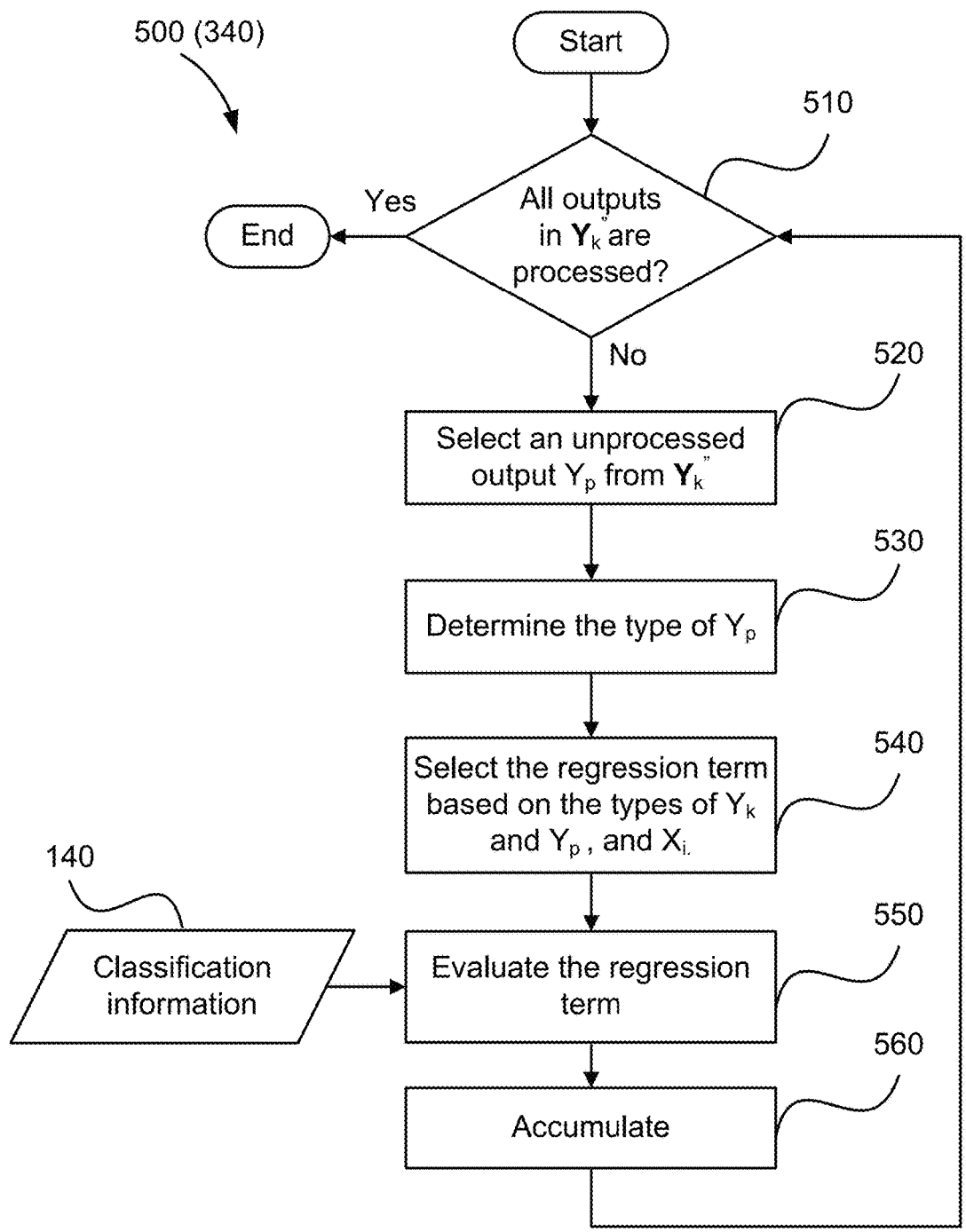
FIG. 5 is a schematic flow diagram illustrating a method of estimating an accuracy improvement which may be achieved by executing a feature extractor of a particular type, when the output of the feature extractor is not directly used for the recognition of a concept.

Details of the estimate direct accuracy improvement step 320 will now be described as a preferred process 400 in reference to FIG. 4. The estimate direct accuracy improvement step 320 processes all output variables $Y_k$ in the set of output variables $Y_i^d$; variables in $Y_i^d$ appear in unary potential functions conditioned on the undetermined feature type $X_i$. In the process 400, an initial check outputs step 410 operates to check if each variable in the set of output variables $Y_i^d$ has been processed. If the check outputs step 410 finds that every variable in the set of output variables $Y_i^d$ has been processed, then the process 400 terminates and execution is returned to the process 300. Otherwise the process 400 continues to a select unprocessed variable step 420. The select unprocessed variable step 420 selects one of the output variables $Y_k$, from the set of output variable $Y_i^d$, i.e., $Y_k \in Y_i^d$ which has not been processed by the process 400 before. A determine type step 430 determines a type $t(Y_k)$ of the unprocessed output variable $Y_k$. Note that the type of a variable is defined based on the state space of the variable. In the example CRF 700 of FIG. 7, the location random variables 723 and 724 which are used for localising people in the image of the scene are of the same type, and variables 725 and 726 which are used for determining the action that people are performing, are of the same type. Similarly, features determined with the same feature extractor are of the same type.

A select direct regression term step 440 selects a direct regression term $R_{i,t(Y_k)}$ corresponding to the type of the unprocessed output variable $Y_k$ and the type of the unevaluated feature type $X_i$. In this implementation, the direct regression term $R_{i,t(Y_k)}$ is of the form $$R_{i,t(Y_k)} = \Theta_{i,t(Y_k)} \cdot \Phi_k(X) \quad \text{(Eq. 3)}$$

where $\Phi_{i,t(Y_k)}$ is a set of regression parameters which are learned from training data using a process 600 which is described in greater detail below with reference to FIG. 6. In the present implementation, $\Phi_k(X)$ is defined as a vector containing a bias term, in this case the numeral 1, and a marginal distribution for the output variable $Y_k$ referred to as such that $$\Phi_k(X) = [1, B_k]^T \quad \text{(Eq. 4)}$$

An alternative implementation may use non-linear regression for the direct regression term $R_{i,t(Y_k)}$. Implementation of non-linear regression is straightforward, although it could be hard to find a non-linear regression which works better than the linear regression. Often, a non-linear regression may be reformulated as a linear regression, but with non-linear regression features. For example, it is possible to use $$\Phi_k(X) = [1, \log(B_k)]^T \text{ or } \Phi_k(X) = [1, H(B_k)]^T \quad \text{(Eq. 5)}$$

where $H(t)$ is a function which measures the entropy of t.

An evaluate regression step 450 evaluates the direct regression term $R_{i,t(Y_k)}$ of Eq. 3 using the classification information 140 before an accumulate step 460 accumulates the regression results for all variables in the set of out variables $Y_i^d$ with the unary potential function conditioned on $X_i$.

Similarly, the estimate indirect accuracy improvement step 340 estimates an indirect accuracy improvement. Details of indirect accuracy improvement estimation will now be described in reference to a process 500 of FIG. 5. Process 500 accumulates the estimation of accuracy improvement for all variables $Y_p$ in the set of all other variable $Y''_k$ with binary potential function containing $Y_k$. An all processed check 510 is the first step in the process 500 of FIG. 5. The all processed check step 510 determines if all variables in the set of all other variables $Y''_k$ with binary potential function containing $Y_k$ have been processed. If every variable in the set of other variables $Y''_k$ with binary potential function containing $Y_k$ has been processed then the results of the all processed check 510 is negative and the process 500 continues to a select unprocessed output step 520 otherwise the process 500 terminates and execution continues to the determine final improvement step 350.

Figure 6:
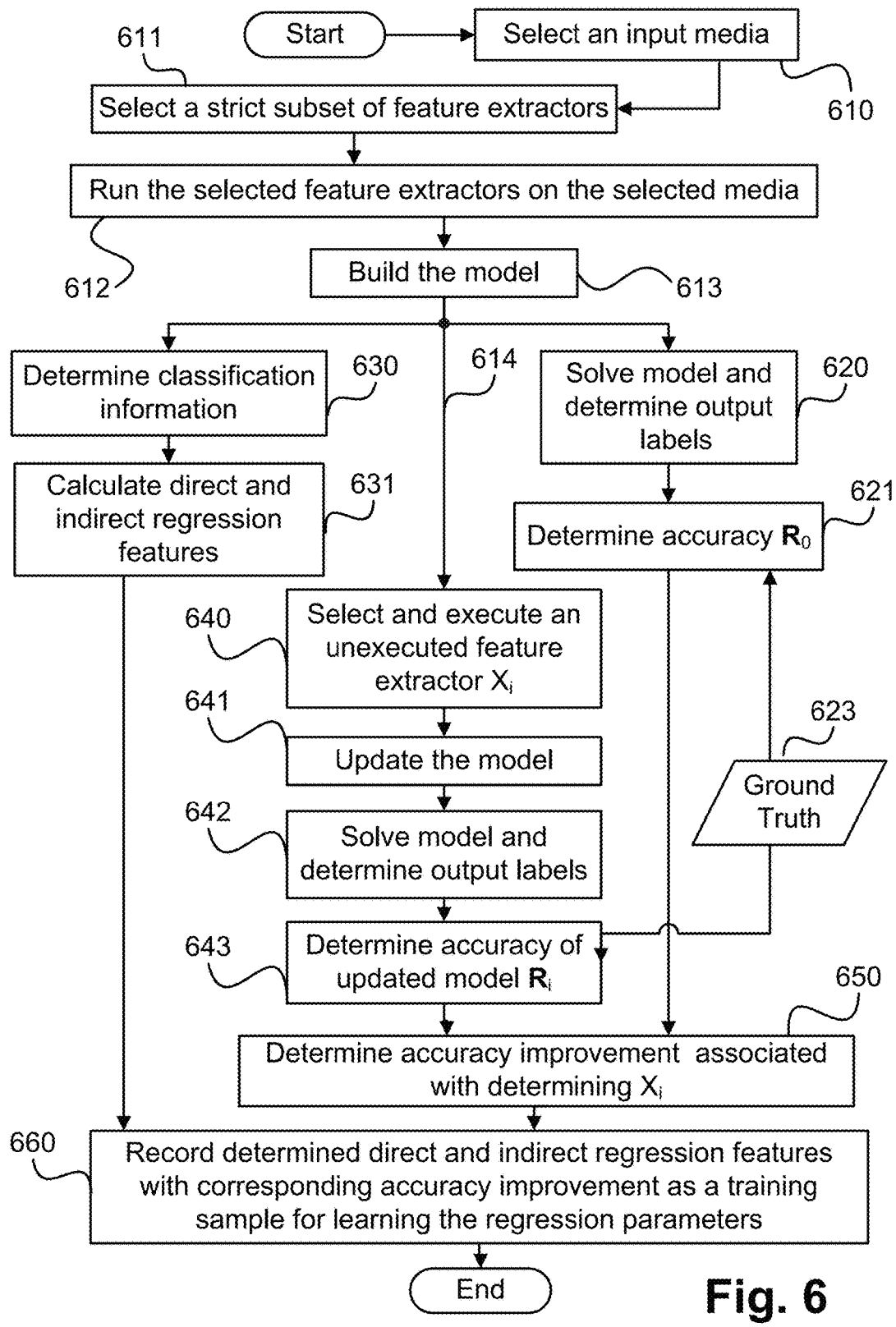
FIG. 6 is a schematic block diagram of a process which generates a training sample for learning regression parameters.

The select unprocessed output step 520 selects one of the unprocessed variables, $Y_p$, from the set of all other variables $Y''_k$ with binary potential function containing $Y_k$. The type determination step 530 determines the type of the unprocessed variable $Y_p$. Next, a select indirect regression term step 540 selects the indirect regression term $(R_{i,t(Y_k),t(Y_p)})$ corresponding to the type of the output variable $Y_k$, type of the output variable $Y_p$, and the unevaluated feature type $X_i$. The indirect regression term $R_{i,t(Y_k),t(Y_p)}$ models the indirect effect of determining the unevaluated feature type $X_i$ on improving the accuracy of the unprocessed variable $Y_p$, due to dependencies between the output variable $Y_k$ and the unprocessed variable $Y_p$. In this example the indirect regression term $R_{i,t(Y_k),t(Y_p)}$ is of the form, $$R_{i,t(Y_k),t(Y_p)} = \Theta_{i,t(Y_k),t(Y_p)} \cdot \Phi_{k,p}(X) \quad \text{(Eq. 6)}$$

where $\Phi_{i,t(Y_k),t(Y_p)}$ is a set of regression parameters which may be learned from training data using the process 600 of FIG. 6. In this example, $\Phi_{k,p}(X)$ is defined as a vector containing a bias term, in this case the numeral 1, the marginal distribution for the output variable $Y_k$ (i.e., $B_k$) and the marginal distribution for the output variable $Y_p$ (i.e., $B_p$), such that $$\Phi_{k,p}(X) = [1, B_k, B_p]^T \quad \text{(Eq. 7)}$$

An evaluate regression term step 550 evaluates the indirect regression term $R_{i,t(Y_k),t(Y_p)}$ of Eq. 6 followed by an accumulation step 560. The accumulate step 560 accumulates the regression results for each variable $Y_p$ a in the set of variables $Y''_k$ with binary potential function containing $Y_k$. An alternative approach is to use non-linear regression for $R_{i,t(Y_k),t(Y_p)}$.

Eq. 3 and Eq. 6 represent the direct regression term $R_{i,t(Y_k)}$ and the indirect regression term $R_{i,t(Y_k),t(Y_p)}$ as linear regression terms using regression features $\Phi_k(X)$ and $\Phi_{k,p}(X)$. The regression parameters $\Theta_{i,t(Y_k)}$ and $\Theta_{i,t(Y_k),t(Y_p)}$ may be learned by minimising an error function. The error function measures how much a prediction deviates from the desired answer as specified by ground truth annotation. For example, the error function could measure mean squared difference between the predicted value and the desired output value. The learning of regression parameters uses the training dataset 930. The ground truth annotation on the training dataset determines the desired output values. The process receives a sample from input training dataset with ground truth annotation on the classes of the output variables as input, and generates a training sample suitable for regression parameter learning for output.

FIG. 6 is a schematic block diagram of a process 600 which generates a training sample for learning the regression parameters. To generate training data for learning the regression parameters, the process 600 is desirably repeated several times using different samples of input media with associated ground truth annotation on the class of output variables, and different combination of feature types to determine the associated feature values. By selecting different combinations of feature types to determine, it is possible to generate multiple regression training samples using a single media training sample. To evaluate the sufficiency of training samples for learning regression parameters, input training set could be divided into regression training set and regression validation set. The regression parameters are determined using regression training set, while the regression validation set is used to evaluate the regression error.

The process 600 is preferably implemented as one of the applications 1033 and starts at a select media step 610 where an input media is selected from the input training set 930. The input media has associated ground truth classification labels 623 that will be used in the step 621 and 643 of the process 600. Next, a select subset step 611 selects a strict subset (being non-empty and not all) of feature extractors to execute on the input media before a run extractors step 612 executes the selected subset of feature extractors on the selected media to generate feature vectors from the input media. A build model step 613 builds a probabilistic model 614 (i.e., a CRF) by determining the value of the unary potential functions based on the values of features determined by the feature extractors. Once the probabilistic model 614 is built, the model 614 is solved, in a solve model step 620 to determine the most probable state (MAP) of the model. The most probable state determines an estimated classification label for each of the output variables. The ground truth classification labels 623 of the input media, associated with the selected media, are used in a determine accuracy step 621 to determine an accuracy of the estimated classification for each output variable of the probabilistic model 614. For each of the output variables of the probabilistic model 614, the accuracy of classification is a zero/one measure which indicates whether or not the estimated label matches the corresponding ground truth label 623. The probabilistic model 614 built in build model step 613 will also be used in generate classification information step 630, to determine classification information for each output variable in the probabilistic model 614.

Next, a calculate regression features step 631 determines vector $\Phi_k(X)$ for each output variable $Y_k$ of the probabilistic model 614. The calculate regression features step 631 also determines the set of regression parameters $\Theta_{i,t(Y_k)}$ and $\Theta_{i,t(Y_k),t(Y_p)}$ for each ordered pair of output variables $Y_k$ and $Y_p$. An execute feature extractor step 640 selects and executes an unexecuted feature extractor from the feature extractors 113. An update model step 641 updates the model 614 built in the build model step 613 by determining the unary potential function values based on the feature value(s) determined in the execute feature extractor step 640 as well as the features determined in the run extractors step 612. Next, a solve model step 642 solves the model updated in the update model step 641 and determines the estimated classification labels before a determine accuracy step 643 determines the classification accuracy of the estimated classification labels for each variable in the updated model. A determine accuracy improvement step 650 determines an accuracy improvement for each variable in the model (if any), which results from executing the feature extractor $X_L$ from the feature extractors 113 selected in the execute feature extractor step 640. A record regression features step 660 stores the determined regression features $\Phi_k(X)$ and $\Phi_{k,p}$ (X) along with the accuracy improvement from the determine accuracy improvement step 650. The output of the process 600 forms the training data for learning the regression parameters.

It will be appreciated that the process 600 of FIG. 6 is in many respects akin to the joint classification process 100 of FIG. 1 excepting that FIG. 6 does not involve an iterative updating of the model but rather simply calculates regression features with a model associated with a selected media type. In this fashion, models and associated regression features can be established for known designated media types, such as "birthday party", "wedding party", "motorsport", and the like.

Other Implementations

An alternative approach for dynamically selecting feature extractors from the feature extractors 113, to determine for the purpose of joint recognition of objects will now be described. The alternative implementation operates in a similar manner as the first implementation described above, but uses different regression features $\Phi_k(X)$ and $\Phi_{k,p}$ (X) in the select direct regression term step 440 and the select indirect regression term step 540 respectively.

Similarly, linear regression is used for the calculation of the direct regression term $R_{i,t(Y_k)}$. The regression features $\Phi_k(X)$, however in this implementation, are defined as $$\Phi_k(x)=[1,B_k,L_k,N_k] \quad \text{(Eq. 8)}$$

where (i) influence aggregation term $L_k$ is a $1 \times n_2$ vector containing the aggregation of the influence of all the variables in the model which appear in a pair-wise potential function also associated with the variable $Y_k$. The set of all such variables is referred to as influence aggregation set $Y_k^d$, and influence aggregation term $L_k$ is defined as:

$$L_k = \sum_{j \in Y_k^d} B_j \times \psi_{j,k}(Y_j, Y_k) \quad \text{(Eq. 9)}$$

(ii) $n_{k,u}$ is the number of edges of a certain type u, connecting the unprocessed output variable $Y_k$ to other nodes in $Y_k^d$.

(iii) |T| is the number of output variable types in the model. An edge is associated with a pair-wise potential function and the type of an edge is defined by the type of the variables in the associated potential function. The edge count vector $N_k$ is a vector containing the $n_{k,u}$ values for all associated output variable types, and is defined as $$N_k=[n_{k,1}, \ldots ,n_{k,u}, \ldots ,n_{k,|T|}] \quad \text{(Eq. 10)}$$

(iv) $\psi_{j,k}$ ($Y_j$, $Y_k$) is an $n_1 \times n_2$ matrix, where $n_1$ is the size of the state space of the output variable $Y_j$ and $n_2$ is the size of the state space of the output variable $Y_k$.

(v) $B_j$ is a $1 \times n_1$ vector containing the marginal distribution of variable $Y_j$.

(vi) $B_j \times \psi_{k,j}(Y_j, Y_k)$ is a $1 \times n_2$ vector containing the result of product of $B_j$ with the matrix $\psi_{k,j}$. $L_k$ is a $1 \times n_2$ vector containing the aggregation of the influences of all the variables in $Y_k^d$ on the variable $Y_k$.

The direct regression term $R_{i,t(Y_k)}$ is then determined using a linear regression formulation similar to Eq. 3.

The indirect regression term $R_{i,t(Y_k),t(Y_p)}$ is also determined using a linear regression formulation of Eq. 6, but with a more complex regression feature $\Phi_{k,p}(X)$ determined as $$\Phi_{k,p}(X)=[1,B_k,B_p,L_p,N_p]^T. \quad \text{(Eq. 11)}$$

where (i) influence aggregation $L_p$ is determined using Eq. 9. The influence aggregation $L_p$ contains the aggregated effect of all variables which appear in a pair-wise potential function with output variable $Y_p$. In other words, influence aggregation $L_p$ is the aggregation of the influences of the marginal probabilities of all the variables with a direct edge to the output variable $Y_k$.

(ii) $B_k$ is a vector containing the marginal distribution of variable $Y_k$.

(iii) $B_p$ is a vector containing the marginal distribution of variable $Y_p$.

(iv) The edge count vector $N_p$ is a vector containing the number of edges of each type.

In the arrangements described herein, output variables are used for recognition of objects and semantic concepts associated with an image or video of the scene. This is an exemplary application only. The methods could similarly be used for selecting and prioritising features for joint classification in any other applications.

INDUSTRIAL APPLICABILITY

The arrangements described are applicable to the computer and data processing industries and particularly for the joint probabilistic recognition and classification of data, and particularly image data. The arrangements disclosed are also applicable to a mixed content scenario, as well other type of inputs. For example, the feature extractors in the set 113 may be configured to use a mix of image, audio and/or text, including applying optical character recognition (OCR) to the image. The text may be the objects in the image. Such may involve further feature extraction based on the supplementary (OCR) text information. In further implementations, different feature extractors may be used, extracting different feature types from audio or text only.

The foregoing describes only some embodiments of the present invention, and modifications and/or changes can be made thereto without departing from the scope and spirit of the invention, the embodiments being illustrative and not restrictive.

I claim:

1. A computer-implemented method of jointly classifying a plurality of objects in an image using a feature type selected from a plurality of feature types, the method comprising:
determining classification information for each of the plurality of objects in the image by applying a predetermined joint classifier to at least one feature of a first type, the at least one feature being generated from the image using a first feature extractor, the classification information being based on a probability of each of a plurality of possible classifications;
estimating, using the determined classification information for each of the plurality of objects in the image, an improvement in an accuracy of classification for each of the plurality of objects corresponding to a feature of a further type, the estimated improvement being a sum of a direct accuracy improvement and an indirect accuracy improvement associated with the feature of the further type, wherein the indirect accuracy improvement estimates an indirect effect of the feature of the further type on improving accuracy of classification based on a dependency between one of the objects and remaining objects of the plurality of objects, a type of each of the plurality of objects, and a number of objects in the image conditioned on the feature of the further type;
selecting the feature of the further type, from the plurality of feature types, according to the estimated improvement in the accuracy of the classification of each of the plurality of objects; and
classifying the plurality of objects in the image using the selected feature of the further type.

2. The method according to claim 1, further comprising determining a benefit of evaluating a particular feature type of the plurality of feature types based on the estimated improvement in accuracy of classification.

3. The method according to claim 2, wherein the benefit is determined by normalising the estimated improvement in accuracy with a computation cost, such that the benefit is a measure of the estimated improvement in accuracy per computation cost.

4. The method according to claim 2, wherein the benefit is determined using a trade-off across expected total accuracy improvement and a computation cost.

5. The method according to claim 1, wherein the direct accuracy improvement and the indirect accuracy improvement are determined based on linear regression of unprocessed features.

6. The method according to claim 5, wherein evaluation of the regression utilizes the determined classification information.

7. The method according to claim 1, wherein the direct accuracy improvement is determined based on non-linear regression of unprocessed features.

8. The method according to claim 1, wherein the estimated improvement is formed using a pair-wise interaction of the determined classification information for each of the objects and a type of each of the objects in the image.

9. A method of jointly classifying a plurality of objects in data using a feature type selected from a plurality of feature types, the method comprising:
determining classification information for each of the plurality of objects in the data by applying a predetermined joint classifier to at least one feature of a first type, the at least one feature being generated from the data using a first feature extractor, the classification information being based on a probability of each of a plurality of possible classifications;
estimating, using the determined classification information for each of the plurality of objects in the data, an improvement in an accuracy of classification for each of the plurality of objects corresponding to a feature of a further type, the estimated improvement being a sum of a direct accuracy improvement and an indirect accuracy improvement associated with the feature of the further type, wherein the indirect accuracy improvement estimates an indirect effect of the feature of the further type on improving accuracy of classification based on a dependency between one of the objects and remaining objects of the plurality of objects, a type of each of the plurality of objects, and a number of objects in the image conditioned on the feature of the further type;
selecting the feature of the further type, from the plurality of feature types, according to the estimated improvement in the accuracy of the classification of each of the plurality of objects; and
classifying the plurality of objects in the data using the selected feature of the further type.

10. The method according to claim 9, wherein the data is at least one of image data, audio data, and text data.

11. The method according to claim 10, wherein the data is image data from which text feature data is extracted by at least one of the feature extractors.

12. A non-transitory computer readable storage medium having a program recorded thereon, the program being executable by a processor to perform a method to jointly classify a plurality of objects in an image using a feature type selected from a plurality of feature types, the method comprising:
determining classification information for each of the plurality of objects in the image by applying a predetermined joint classifier to at least one feature of a first type, the at least one feature being generated from the image using a first feature extractor, the classification information being based on a probability of each of a plurality of possible classifications;
estimating, using determined classification information for each of the plurality of objects in the image, an improvement in an accuracy of classification for each of the plurality of objects corresponding to a feature of a further type, the estimated improvement being a sum of a direct accuracy improvement and an indirect accuracy improvement associated with the feature of the further type, wherein the indirect accuracy improvement estimates an indirect effect of the feature of the further type on improving accuracy of classification based on a dependency between one of the objects and remaining objects of the plurality of objects, a type of each of the plurality of objects, and a number of objects in the image conditioned on the feature of the further type;
selecting the feature of the further type, from the plurality of feature types, according to the estimated improvement in the accuracy of the classification of each of the plurality of objects; and
classifying the plurality of objects in the image using the selected feature of the further type.

13. The non-transitory computer readable storage medium according to claim 12, wherein the method further comprises determining a benefit of evaluating a particular feature type of the plurality of feature types based on the estimated improvement in accuracy of classification, wherein the benefit is determined according to at least one of:
normalising the estimated improvement in accuracy with a computation cost, such that the benefit is a measure of the estimated improvement in accuracy improvement per computation cost; and
using a trade-off across expected total accuracy improvement and a computation cost.

14. The non-transitory computer readable storage medium according to claim 12, wherein the direct accuracy improvement and the indirect accuracy improvement are determined based on linear regression of unprocessed features and the evaluation of the regression utilizes the determined classification information.

15. The non-transitory computer readable storage medium according to claim 12, wherein the direct accuracy improvement is determined based on non-linear regression of unprocessed features.

16. The non-transitory computer readable storage medium according to claim 12, wherein the estimated improvement is formed using a pair-wise interaction of the determined classification information for each of the objects and a type of each of the objects in the image.

17. A computer apparatus comprising a processor, a memory and a program recorded to the memory, the program being executable by the processor to perform a method to jointly classify a plurality of objects in data using a feature type selected from a plurality of feature types, the method comprising:
- determining classification information for each of the plurality of objects in the data by applying a predetermined joint classifier to at least one feature of a first type, the at least one feature being generated from the data using a first feature extractor, the classification information being based on a probability of each of a plurality of possible classifications;
- estimating, using the determined classification information for each of the plurality of objects in the data, an improvement in an accuracy of classification for each of the plurality of objects corresponding to a feature of a further type, the estimated improvement being a sum of a direct accuracy improvement and an indirect accuracy improvement associated with the feature of the further type, wherein the indirect accuracy improvement estimates an indirect effect of the feature of the further type on improving accuracy of classification based on a dependency between one of the objects and remaining objects of the plurality of objects, a type of each of the plurality of objects, and a number of objects in the image conditioned on the feature of the further type;
- selecting the feature of the further type, from the plurality of feature types, according to the estimated improvement in the accuracy of the classification of each of the plurality of objects; and
- classifying the plurality of objects in the data using the selected feature of the further type.

18. The computer apparatus according to claim 17, wherein the data is at least one of image data, audio data, text data, and image data from which text feature data is extracted by at least one of the feature extractors.

* * * * *